United States Patent
Miller et al.

(10) Patent No.: US 8,793,421 B2
(45) Date of Patent: Jul. 29, 2014

(54) QUEUE ARBITRATION USING NON-STALLING REQUEST INDICATION

(75) Inventors: William V. Miller, Austin, TX (US); Chameera R. Fernando, Austin, TX (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 13/286,074

(22) Filed: Oct. 31, 2011

(65) Prior Publication Data

US 2013/0111090 A1     May 2, 2013

(51) Int. Cl.
*G06F 13/00*     (2006.01)
*G06F 13/16*     (2006.01)

(52) U.S. Cl.
CPC ................ *G06F 13/1663* (2013.01)
USPC ........... 710/112; 710/119; 710/120; 710/242; 710/243; 710/309

(58) Field of Classification Search
CPC ............ G06F 13/1642; G06F 13/4031; H04L 12/5693; H04L 49/90
USPC .......................... 710/240–244, 112–125, 309
See application file for complete search history.

(56) References Cited

U.S. PATENT DOCUMENTS

| | | | |
|---|---|---|---|
| 5,485,586 A * | 1/1996 | Brash et al. .................. | 710/112 |
| 5,528,767 A * | 6/1996 | Chen ........................... | 710/113 |
| 5,546,546 A * | 8/1996 | Bell et al. .................... | 710/112 |
| 6,108,735 A * | 8/2000 | Pawlowski ................... | 710/107 |
| 6,246,256 B1 * | 6/2001 | Liu et al. ...................... | 326/38 |
| 6,420,901 B2 * | 7/2002 | Liu et al. ...................... | 326/38 |
| 6,570,403 B2 * | 5/2003 | Liu et al. ...................... | 326/38 |
| 6,732,209 B1 * | 5/2004 | Cherukuri et al. ............ | 710/240 |
| 6,745,273 B1 | 6/2004 | Gehman et al. | |
| 6,898,649 B2 * | 5/2005 | Goudie ......................... | 710/112 |
| 6,934,294 B2 * | 8/2005 | Bertagna ...................... | 370/412 |
| 7,073,005 B1 * | 7/2006 | Basu et al. .................... | 710/240 |
| 7,076,595 B1 | 7/2006 | Dao et al. | |
| 7,124,232 B2 * | 10/2006 | Takeda et al. ................. | 710/310 |
| 7,200,137 B2 | 4/2007 | Dorr et al. | |
| 7,302,510 B2 * | 11/2007 | Fredrickson et al. ......... | 710/243 |
| 7,356,631 B2 * | 4/2008 | Lin ............................... | 710/243 |
| 7,490,184 B2 | 2/2009 | Srinivasan | |

(Continued)

OTHER PUBLICATIONS

Soundararajan et al. Analysis and Solutions to Issue Queue Process Variation. IEEE. 2008.*

(Continued)

*Primary Examiner* — Matthew D Spittle
(74) *Attorney, Agent, or Firm* — Meyertons, Hood, Kivlin, Kowert & Goetzel, P.C.

(57) ABSTRACT

Techniques are disclosed relating to request arbitration between a plurality of master circuits and a plurality of target circuits. In one embodiment, an apparatus includes an arbitration unit coupled to a plurality of request queues for a target circuit. Each request queue is configured to store requests generated by a respective one of a plurality of master circuits. The arbitration unit is configured to arbitrate between requests in the plurality of request queues based on information indicative of an ordering in which requests were submitted to the plurality of request queues by master circuits. In some embodiments, each of the plurality of master circuits are configured to submit, with each request to the target circuit, an indication specifying that a request has been submitted, and the arbitration unit is configured to determine the ordering in which requested were submitted based on the submitted indications.

19 Claims, 7 Drawing Sheets

(56) References Cited

U.S. PATENT DOCUMENTS

| | | | |
|---|---|---|---|
| 7,603,503 B1* | 10/2009 | Hutsell et al. | 710/241 |
| 7,802,040 B2* | 9/2010 | Aldworth et al. | 710/118 |
| 7,882,292 B1* | 2/2011 | Van Dyke et al. | 710/244 |
| 7,962,678 B2* | 6/2011 | Minami et al. | 710/119 |
| 8,140,727 B2* | 3/2012 | Minami et al. | 710/119 |
| 8,234,428 B2* | 7/2012 | Osano et al. | 710/119 |
| 8,478,950 B2* | 7/2013 | Henriksson et al. | 711/158 |
| 2005/0102456 A1* | 5/2005 | Kang | 710/113 |
| 2006/0101178 A1* | 5/2006 | Zhong et al. | 710/112 |
| 2008/0082707 A1 | 4/2008 | Gupta et al. | |
| 2013/0275662 A1* | 10/2013 | Henriksson et al. | 711/105 |

OTHER PUBLICATIONS

Ahmed et al. Switched Multi-hop Priority Queued Networks Influence of Priority Levels on Soft Real-Time Performance. Technical Report. IDE1044. Jun. 2010.*

Stallings, William. Queuing Analysis. 2000.*

* cited by examiner

QUEUE ARBITRATION USING NON-STALLING REQUEST INDICATION

BACKGROUND

1. Technical Field

This disclosure relates generally to integrated circuits, and, more specifically, to arbitrating between circuits that share a common resource.

2. Description of the Related Art

In integrated circuits such as processors, various units may generate requests that are serviced by other units. These requests may be for particular operations or for particular resources provided by such units. In some instances, various requesting units may send requests to the same servicing unit. Depending on the availability of this unit, one requesting unit may be forced to compete with another requesting unit. In some circumstances, this competition can result in a deadlock in which the servicing unit is not servicing requests for any of the requesting units.

SUMMARY OF EMBODIMENTS

In one embodiment, an integrated circuit includes a plurality of circuits (referred to as "masters") that generate requests that are serviced by a respective one of a plurality of other circuits (referred to as "targets"). In some instances, a request may pass through multiple sets of latches (i.e., latch stages) before it arrives at a target circuit. If a target circuit is currently unable to service a request, the integrated circuit may hold (i.e., stall) the request at one of the latch stages such that the latch stages may function as stages in a queue.

In some embodiments, particular ones of the master circuits may be configured such that they can process responses generated by target circuits in only the order in which the requests were submitted. For example, if a master circuit submitted first and second requests to a target circuit and then submitted a third request to another target. The master circuit processes the responses for the first request, second request, and third request in that order. In some circumstances, a deadlock situation can occur when multiple masters are submitting requests to multiple targets.

In one embodiment, master circuits are further configured to submit, with each request, an indication specifying that a request has been submitted. In some embodiments, each indication is a value (e.g., a token) propagated through an additional set of latches that may be included along the path traversed by the request. In one embodiment, the indication does not stall while traversing the path even if the request for that indication stalls. In one embodiment, an arbitration unit uses the indications submitted by multiple master circuits to determine the order in which requests were initially submitted and uses this determination to further determine the ordering in which a target circuit is to service requests.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units. . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C.§112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 1A:
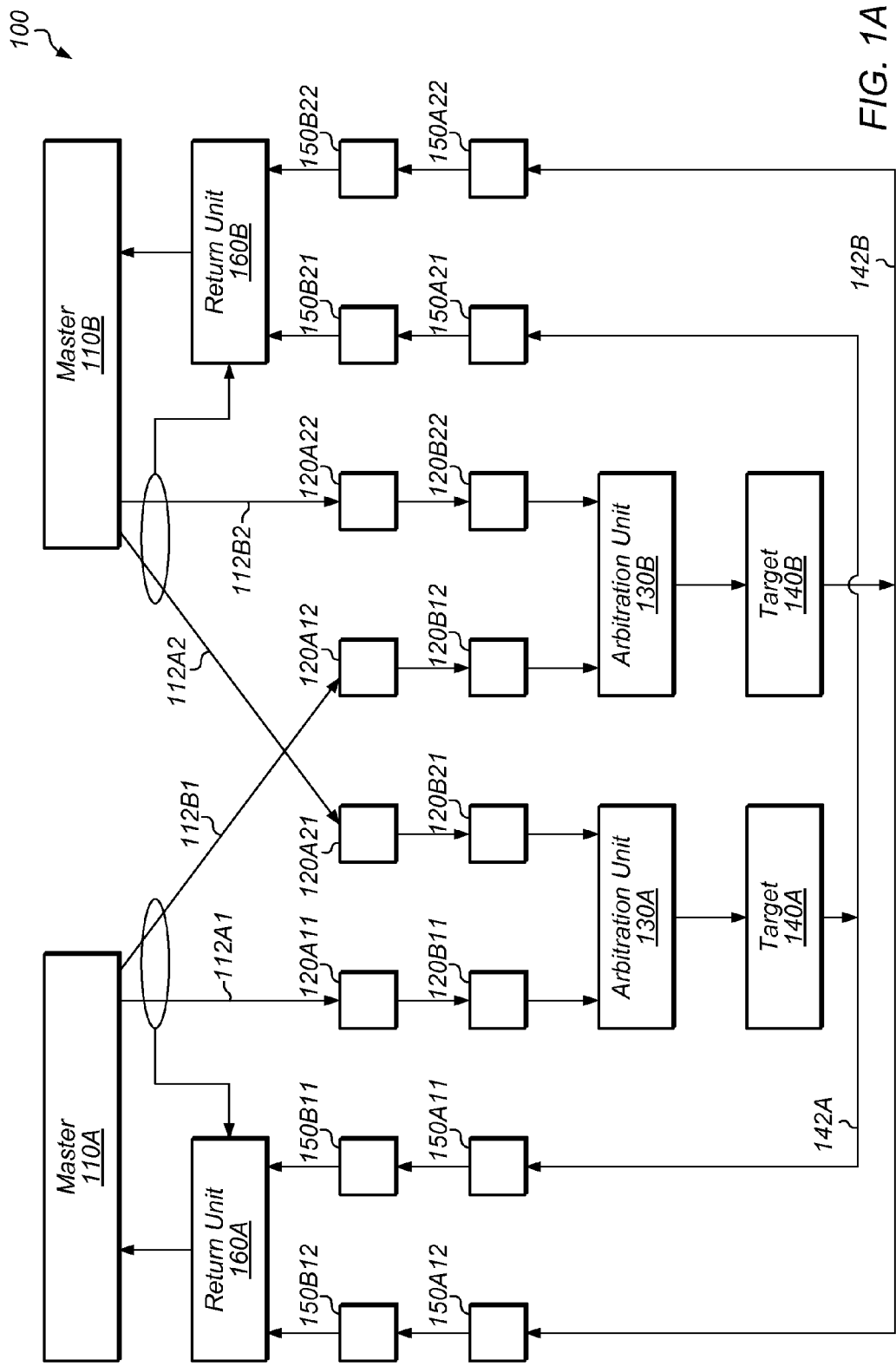
FIG. 1A is a block diagram illustrating one embodiment of a system that includes multiple masters and multiple targets.

Turning now to FIG. 1A, a block diagram of a system 100 that includes multiple master circuits (shown as masters 110A and 110B) and multiple target circuits (shown as targets 140A and 140B) of is depicted.

Masters 110 may correspond to any of a variety of circuits configured to generate requests that are serviceable by one or more other circuits. Similarly, targets 140 may correspond to any circuits configured to service those requests. Accordingly, in some embodiments, masters 110 and targets 140 may be circuits within a computer system. For example, in one embodiment, masters 110 may be processors and targets 140 may be memory or peripheral devices. In some embodiments, masters 110 and targets 140 may be circuits within a processor. For example, in one embodiment, masters 110 may be cores within a processor and targets 140 may be bridge controllers, memory controllers, bus controllers, etc. In one embodiment, masters 110 and targets 140 may be different units in a graphics processor pipeline. In some embodiments, circuits may be configured to generate requests as masters 110 and service requests as targets 140. In various embodiments, system 100 may include more masters 110 and/or targets 140 than shown.

In illustrated embodiment, masters 110A and 110B are configured to generate requests 112A1-112B2 sent through multiple request stages 120A11-120B22 to arbitration units 130A and 130B. In one embodiment, arbitration units 130A and 130B are configured to select ones of requests 112 and provide the requests 112 to targets 140A and 140B, respectively. Targets 140A and 140B, in turn, are configured to service the requests 112 by generating corresponding responses 142A and 142B. These response 142 are then sent back through response stages 150A11-150B22 to return units 160A and 160B. In one embodiment, each return unit 160 is configured to store the order in which a respective master 110 submitted requests 112, and to provide responses 142 back to the master 110 in that order. As will be discussed below, various constraints of units 110-160 may cause system 100 to be configured in manner that produces a deadlock (i.e., the situation in which requests 112 are not being serviced and/or responses 142 are not being processed) under some circumstances.

As an example, in some embodiments, masters 110 may be configured to issue requests 112 to different targets 140 such that requests 112 can be serviced in parallel or out of order; however, masters 110 may be configured to process responses 142 for the requests in only the order in which requests 112 were issued. Accordingly, if master 110A submits a request 112A1 followed by a request 112B1, master 110A may not be configured to process the response 142B before processing the response 142A. In some instances, this constraint may exist because adding the support to process responses out of order may not be merited given the function, size, and/or complexity of a master 110.

In some embodiments, requests 112 and responses 142 may pass through several stages of latches (shown in the illustrated embodiment as request stages 120 and return stages 150) before reaching their respective destinations. This constraint may exists because a master 110 may be far enough away from a target 140 that a request 112 or response 142 cannot traverse the distance within a single clock cycle for system 100. As will be discussed below, in various embodiments, stages 120 along a given path between a master 110 and a target 140 (e.g., stages 120A11 and 120B11 along the path between master 110A and target 140A) may be configured implement queue stages within a first-in-first-out (FIFO) request queue. In one embodiment, arbitration units 130 may be configured to remove requests 112 from the request queues implemented by stages 120, and provide those requests 112 to targets 140 as the targets 140 become available to service those requests 112. If a target 140 is unavailable to service a request 112, the arbitration unit 130 for that target 140 may stall the request in its queue (i.e., cause the stage 120 storing the request 112 to continue storing the request and not propagate the request to a next stage 120). In various embodiments, stages 150 may be configured in a similar manner to implement response queues for propagating and stalling responses 142 being sent back to masters 110.

In some embodiments, targets 140 may take several cycles to service requests 112, and different targets 140 may take different numbers of cycles to process requests 112 relative to one another. This constraint may exist for a variety of reasons depending upon the nature of the request, complexity of the target 140, etc.

In some embodiments, targets 140 may be configured to issue a multiple-burst response 142 over multiple cycles for a single request 112. For example, if target 140A is configured to generate a two-burst response for master 110A, response stage 150B11 may store the first burst of the response while stage 150A11 stores the second burst of the response. In some embodiments, target 140A may not be able to issue another response to master 110A until response stages 150A11 and 150B11 become available to store that response.

Various ones of these constraints may cause system 100 to experience a deadlock (such as described next with respect to FIG. 1B). These constraints are exemplary; deadlocks may also be caused due to other constraints or factors not discussed above.

Various structures and techniques are disclosed that may, in some embodiments, prevent deadlock conditions. Furthermore, in some embodiments, such structures and/or techniques may be used for applications other than deadlock prevention. It is noted that systems that use the structures and/or techniques described herein do not need have to every (or any) of the constraints listed above to experience a deadlock situation.

Figure 1B:
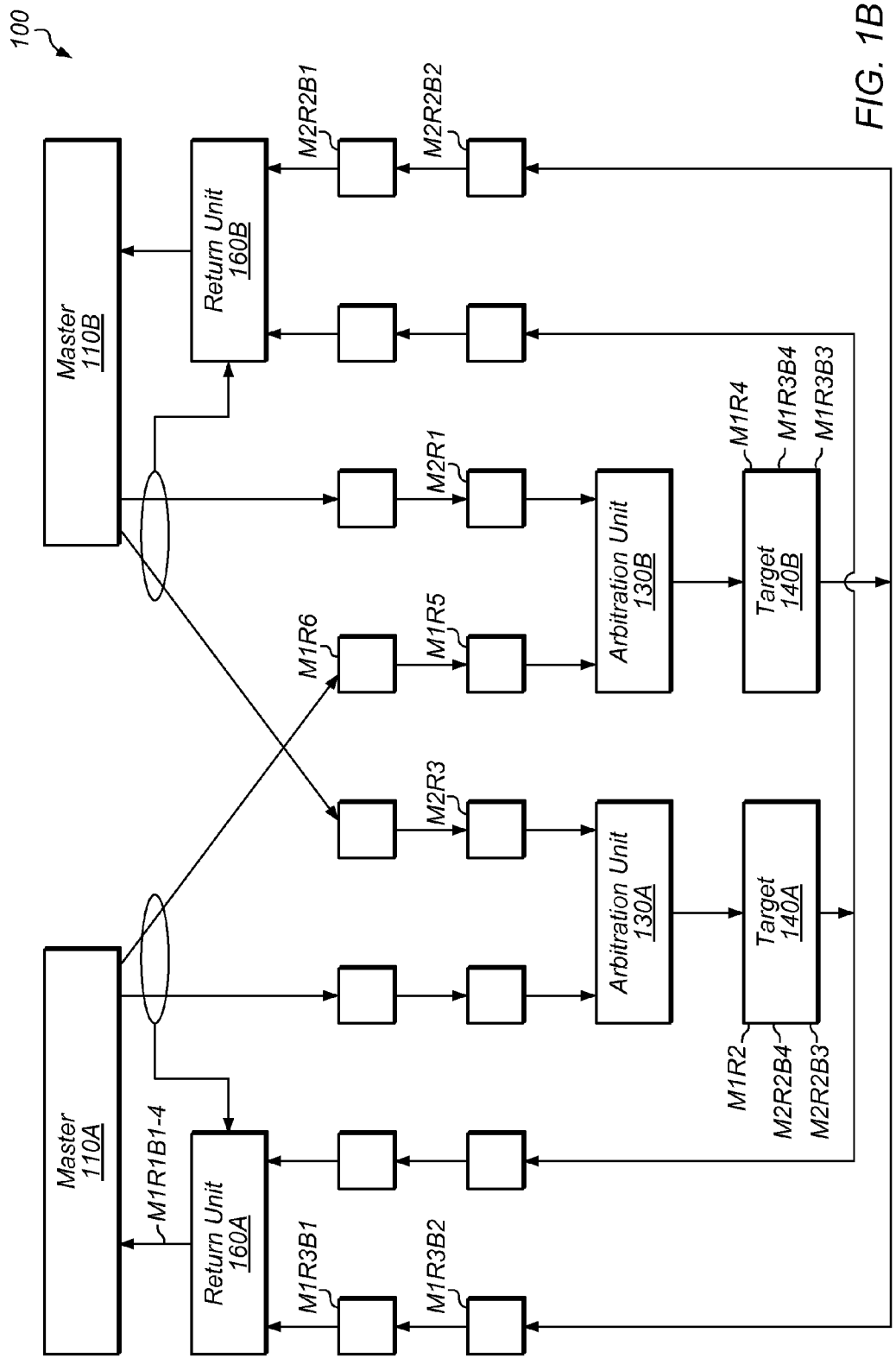
FIG. 1B is a block diagram illustrating an example of a deadlock within such a system.

Turning now to FIG. 1B, an example of a deadlock within system 100 is depicted. In this example, master 110A generates and submits a set of requests M1R1-M1R6 (requests are denoted by their generating master 110 followed by the number of the request; thus M1R1 is the first request generated by master 1—master 110A in this case). Requests M1R1 and M1R2 are submitted to target 140A, and requests M1R3-M1R6 are submitted to target 140B. Master 110B then generates and submits requests M2R1-M2R3. Request M2R1 is submitted to target 140B, and requests M2R2 and M2R3 are submitted to target 140A.

Target 140A begins by servicing request M1R1. As target 140 services request M1R1 over several cycles, it produces a four-burst response M1R1B1-B4 (as shown, responses are denoted by the requesting master, the request number, and the burst number within the response; thus, the burst M1R1B1 is a response to master 1's first request and is the first burst of the response), which is routed back though stages 150 and return unit 160A.

While request M1R1 is being serviced, request M1R2 arrives at stage 120B11 and then some time later request M2R2 arrives at stage 120B21. When performance of request M1R1 completes, arbitration unit 130A selects M2R2 as it is configured, in the illustrated embodiment, to select requests from stages 120B11 and 120B21 in a round-robin manner. This selection now creates a potential issue when target 140A produces a response for request M2R2 as request M2R2 has passed request M1R2.

Meanwhile, target 140B begins servicing request M1R3 and request M1R4 before request M2R1 arrives at arbitration unit 130B. However, the issue noted above becomes a problem when target 140B sends the burst response M1R3B1-B4 back to master 110A.

At this point, a deadlock situation has occurred as the burst response M1R3B1-B4 is stalled in stages 150A12 and 150B12 because master 110A cannot begin processing that response until the response for request M1R2 is received. However, request M1R2 is held up behind request M2R2 because the response M2R2B1-B4 cannot be processed by master 110B until the response for request M2R1 is received. Request M2R1, in turn, is held up behind the response M1R3B1-B4. As a result, a deadlock situation has occurred.

Figure 2:
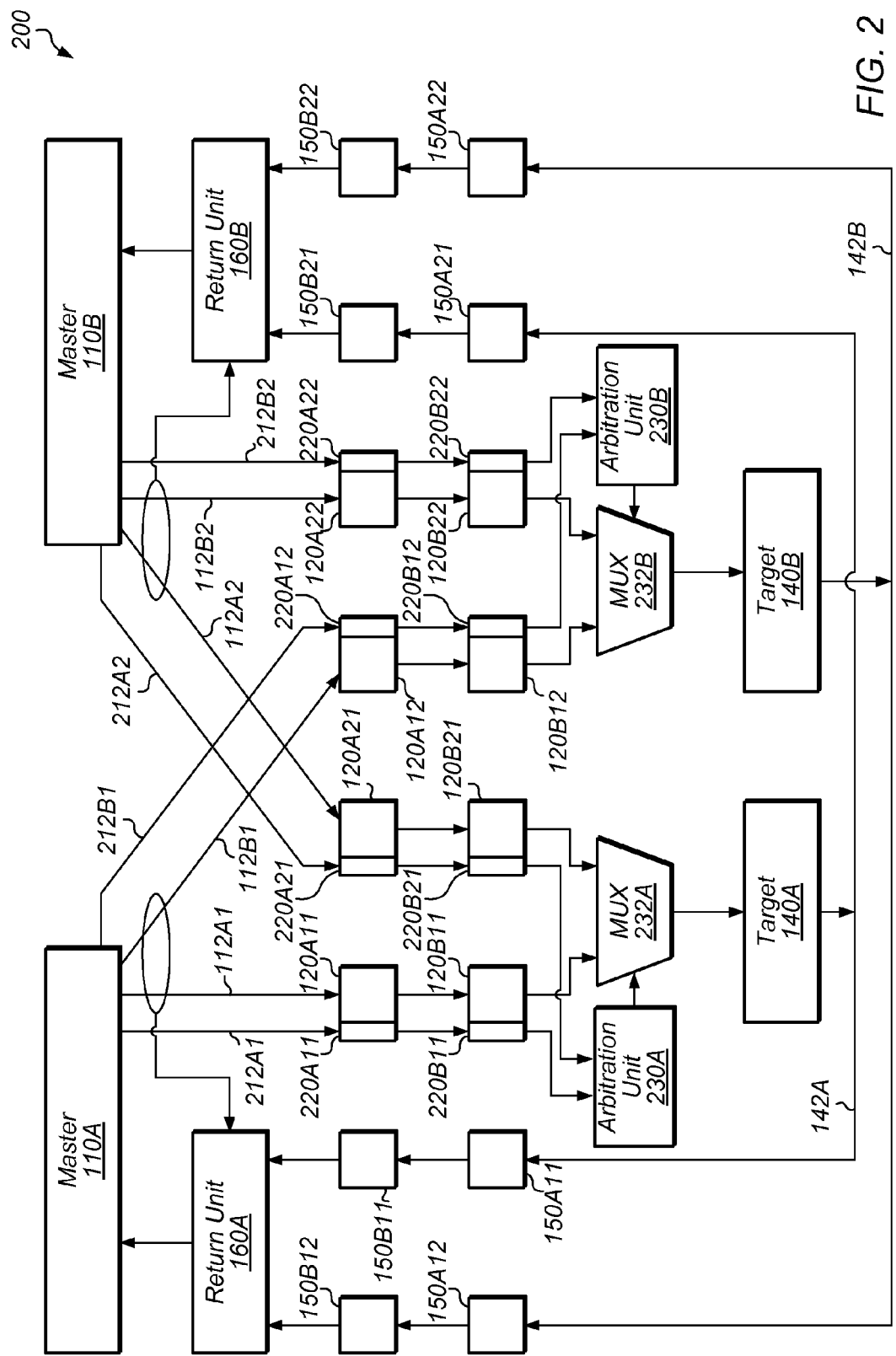
FIG. 2 is a block diagram illustrating another embodiment of the system.

Turning now to FIG. 2, a block diagram of a system 200 is depicted. In some embodiments, system 200 is configured to prevent the deadlock problem described above. In the illustrated embodiment, system 200 includes masters 110, request stages 120, targets 140, response stages 150, and return units 160. System 200 further includes indication stages 220A11-B22, arbitration units 230A and 230B, and multiplexers (MUXs) 232A and 232B. As noted above, in some embodiments, system 200 may include more or less masters 110 and/or targets 140.

In some embodiments, system 200 may also include more or less request stages 120 and response stages 150. Accordingly, in one embodiment, each master 110 may have the same number of stages 120 between it and each of the targets 140 that it interacts with, but a given master 110 may have a different number of stages relative to another master 110. For example, requests of master 110A may traverse five stages 120 when going to targets 140 while requests of master 110B may traverse three stages when going to targets 140. In another embodiment, each target 140 may have the same number of stages 120 between it and each master 110 that it interacts with, but a given target 140 may have a different number of stages relative to another target 140. For example, requests for target 140A may traverse five stages while requests for target 140B may traverse two stages.

As discussed above, in various embodiments, masters 110 are configured to submit requests 112 to targets 140 via request stages 120. In the illustrated embodiment, masters 110 are further configured to submit an indication 212A1-212B2 in conjunction with each request 112, where the indication 212 indicates that a request 112 has been submitted. In some embodiments, each indication 212 is a single-bit value propagated through stages 220 to an arbitration unit 230. For example, master 110A may write a logical-one, in one embodiment, to stage 220A11 upon submitting a request 112A1 to stage 120A11. In other embodiments, each indication 212 may be multiple-bit value that specifies a priority for the submitted request. For example, requests 112 may be assigned a priority of one, two, or three—one being the lowest priority and three being the highest priority. If a request 112 is important, master 110A may submit a value of three as the indication 212 for that request 112.

Indication stages 220, in one embodiment, are latch stages that include one or more latches configured to store an indication 212 as it traverses system 200 to an arbitration unit 230. In some embodiments, each indication stage 220 may be associated with a respective one of stages 120 such that latches for a given stage 220 are located in the same location (e.g., on a die) as latches for the stage 120 to which it is associated with. For example, latches for stages 120A11 and 220B11 may be located in the same locations along the same path between master 110A and target 140A. In other embodiments, however, stages 220 may be located independently of stages 120.

As noted above, in various embodiments, latches of stages 120 may be configured to implement requests queues in which requests 112 can be stalled waiting for service by targets 140. In the illustrated embodiment, stages 220 are configured to propagate indications 212 to arbitration unit 230 without stalling indications 212 when the requests 112 associated with those indications 212 stall in stages 120. Accordingly, if a request 112A1 is submitted to target 140 but stalls at the queue stage implement by stage 120A11, the indication 212A1 corresponding to that request 112A1 continues on from stage 220A11 to stage 220B11, and then to arbitration unit 230A. As will be discussed below with respect to FIG. 3, latches in stages 220 may be driven separately (e.g., by separate latch signals) than latches in stages 120. For example, in one embodiment, latches in stages 220 may be driven during each clock cycle while latches in stages 120 may be driven only when a target 140 is able to service a request 112 from stages 120.

Arbitration units 230, in one embodiment, are configured to select which requests 112 are serviced by a respective target 140 based on the ordering in which requests 112 were submitted to request stages 120 for that target 140. In the illustrated embodiment, an arbitration unit 230 determines the submission order based on when it receives the indications 212. For example, during a first clock cycle, master 110A may submit a request 112A1 and an indication 212A1 to stages 120A11 and 220A11, respectively. The following clock cycle, master 110B may then submit a request 112A2 and an indication 212A2 to stages 120A21 and 220A21. In one embodiment, if stages 220 are driven during each cycle, arbitration unit 230A may receive the first indication 212A1 a cycle later and the second indication 212A2 two cycles later—since each request queue in the illustrated embodiment has a respective length of two stages 120. Because the indication 212A arrives one cycle before the indication 212B, arbitration 230A determines that the request 112A was submitted before the request 112B, and, in one embodiment, selects the request 112A for service by target 140A before selecting the request 112B.

In the event that two or more requests 112 are submitted at the same time, arbitration units 230 may use any of various criteria to determine which request 112 is to be serviced first. Accordingly, in one embodiment, arbitration unit 230 may be configured to select requests 112 from a particular master 110 before requests 112 from other masters 110. For example, requests 112 for master 110A are always selected in the event of a tie. In another embodiment, arbitration units 230 may select requests 112 in a round-robin manner. For example, an arbitration unit 230 may select a request 112 of master 110A during a first tie, and select a request 112 of master 110B during a second tie. In some embodiments, if indications 212 specify respective priorities, arbitration units 230 may be configured to select requests 112 with higher priorities before those with lower priorities.

In one embodiment, as each arbitration unit 230 determines an ordering for servicing requests 112 for its target 140, arbitration units 230 are configured to select requests 112 by instructing respective multiplexers 232 to allow requests 112 to pass from stages 120 to targets 140. It is noted that, in the illustrated embodiment, requests 112 are not processed by arbitration units 230, and thus do not pass through units 230. (In other embodiments, however, requests 112 may be provided to arbitration units 230 such as shown in FIG. 1A with respect to arbitration units 130; in some embodiments, muxes 232 may also be considered as part of arbitrations units 230).

By selecting requests in the manner described above, in some embodiments, arbitrations units 230 are configured to prevent the deadlock situation described above by not permitting a later submitted request for a target 140 (e.g., request M2R2) to pass an earlier submitted request for that target 140 (e.g., request M1R2). Arbitration units 230 are described in further detail below with respect to FIG. 4.

Figure 3:
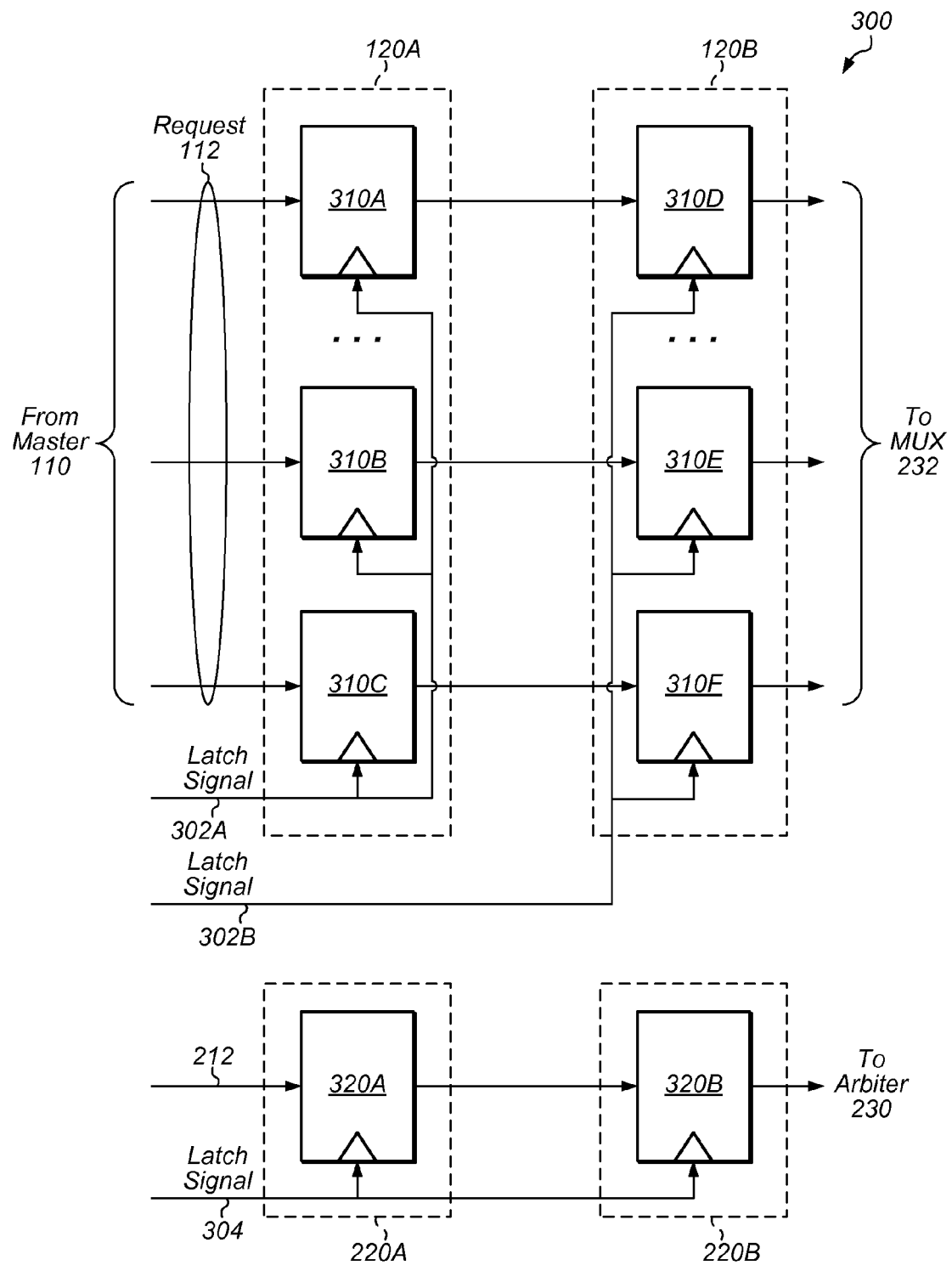
FIG. 3 is a block diagram illustrating one embodiment of a path between a master and a target.

Turning now to FIG. 3, a block diagram of a path 300 between a master 110 and a target 140 is depicted. In the illustrated embodiment, the path 300 has a length of two stages as it includes requests stages 120A and 120B and indication stages 220A and 220B. As shown, stages 120 include a first set of latches 310A-F, and indication stages 220 include a second set of latches 320A and 320B. As noted above, in some embodiments, path 300 may include more or less stages 120 and stages 220.

Latches 310, in one embodiment, are configured to store bits of requests 112 as the requests 112 traverse stages 120 to a target 140. Latches 310 (as well as latches 320) may be any suitable type of latch (i.e., flip-flop) configured to store bits of data such as set-reset (SR) latches, gated D latches, JK latches, etc. In the illustrated embodiment, latches 310 are driven (i.e., caused to store and propagate data) by latch signals 302A and 302B. In various embodiments, latch signals 302 may be cycled to drive latches 310 when a request 112 from master 110 is made and stages 120 are presently empty or in response to a target 140 being able to service another request 112 stored in latches 310. Accordingly, when latch signal 302A is cycled, the request 112 from master 110 may be advanced to stage 120A and stored in latches 310A-C. Then when latch signal 302B is cycled, the request 112 stored at stage 120A may be advanced from latches 310A-C to latches 310D-F at stage 120B. Then, the request 112 stored at stage 120B may be output, in one embodiment, to a multiplexer 232. In one embodiment, the latch signals 302A and 302B may be cycled at the same time as each other or independently to appropriately advance or stall the request queue.

Latches 320, in one embodiment, are configured to store bits of indications 212 as they traverse stages 220 to an arbitration unit 230. In the illustrated embodiment, latch 320A and 320B are configured to store and propagate single-bit indications 212 to an arbitration unit 230. However, in other embodiments, additional latches 320 may be included in each stage 220 to propagate indications 212 that have multiple-bit values such as those that specify a respective priority such as described above. In the illustrated embodiment, latches 320 are driven by a latch signal 304. In various embodiments, signal 304 is configured to be cycled separately from signal 302, and may be cycled at regular intervals such as during every clock cycle of system 200.

Figure 4:
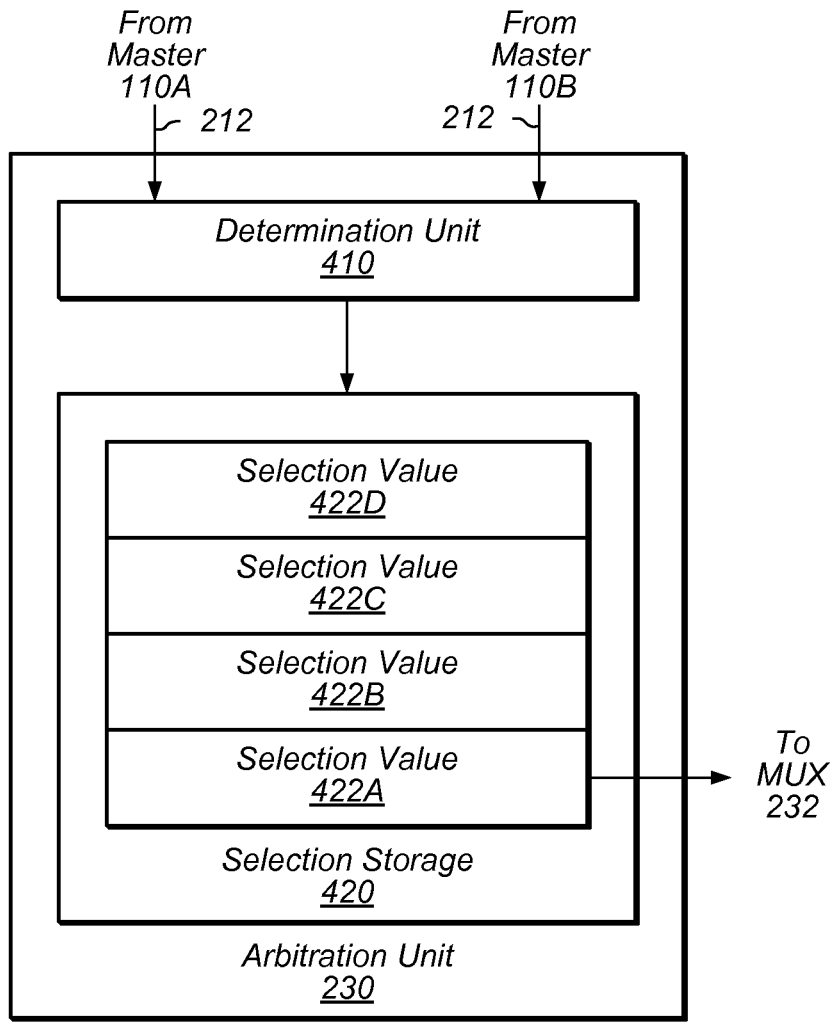
FIG. 4 is a block diagram illustrating one embodiment of an arbitration unit within the system.

Turning now to FIG. 4, a block diagram of arbitration unit 230 is depicted. As discussed above, in various embodiments, arbitration unit 230 is configured to select the ordering in which a target 140 services requests. In the illustrated embodiment, arbitration unit 230 includes a determination unit 410 and selection storage 420.

Determination unit 410, in one embodiment, is configured to generate the ordering used to select requests 112 based on received indications 212. As discussed above, determination unit 410 may select requests 112 for servicing in the order in which they were submitted to request stages 120 of a given target 140. In the event that two or more requests are submitted simultaneously, determination unit 410 may select requests 112, in some embodiments, based on a round-robin algorithm, priorities specified by the indications 212, etc. In the illustrated embodiment, determination unit 410 is configured to store information indicative of which requests 112 have been selected as selections 422 in selection storage 420.

Selection storage 420, in one embodiment, is configured to store selection values 422 until they can be provide to a multiplexer 232 as a target 140 becomes available to service requests 212. The selection values 422 are stored and then used to control the multiplexer 232 in a first-in-first-out (FIFO) manner. The number of selection values 422 equal the number of request stages 120 from all masters 110 to the particular target 140. In one embodiment, where the number of request stages 120 are the same from all masters 110, storage 420 is configured to store M×N selection values 422, where M is the number of masters 110 sending requests to a particular target 140 and N is the number of request stages 120 between the target 140 and a master 110. For example, in the illustrated embodiment shown in FIG. 2, storage 420 stores 4 (2×2) selection values 422 since system 200 includes two masters (masters 110A and 110B) and two request stages 120 between each master 110 and a target 140. Each selection value 422 indicates the master 110 to be selected when that selection value 422 is the one being used to control multiplexer 232. In one embodiment, the number of bits used by each selection value 422 may be the $\log_2$ of the number of masters (M). For example, in the illustrated embodiment shown in FIG. 2, each selection value may be a single bit ($\log_2 2=1$). In another embodiment, each selection value 422 may be comprised of a bit for each master, with at most one bit being active at any time (some times this is referred to as being "one-hot" selection).

Figure 5:
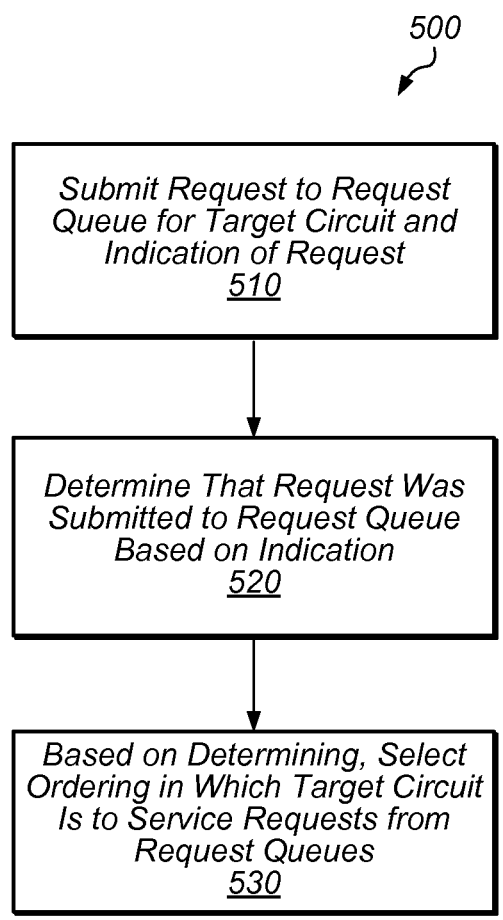
FIG. 5 is a flow diagram illustrating one embodiment of a method performed by the system.

Turning now to FIG. 5, a flow diagram of a method 500 is depicted. Method 500 is one embodiment of a method that may be performed by a system that includes master circuits and target circuits such as system 200. In some embodiments, performance of method 500 may improve the arbitration of requests from master circuits to target circuits by preventing deadlocks.

In step 510, a master circuit (e.g., master 110) submits a request (e.g., a request 112) to one of several request queues (e.g., queues implemented by request stages 120) for a target circuit (e.g., target 140) and an indication (e.g., an indication 212) of the request to one of several indication stages (e.g., indication stages 220), which forward on the indication to an arbitration unit (e.g., arbitration unit 230). As discussed above, in one embodiment, the request queue may include one or more stages (e.g. implemented by stages 120), each configured to store a request. In one embodiment, each stage may also be associated with an indication stage (e.g. implemented by stages 220) with a respective latch (e.g., a latch 320), and the indication may be sent via the one or more respective latches. In various embodiments, the one or more latches are driven separately (e.g., by signal 304 as opposed to being driven by signal 302) from latches (e.g., latches 310) implementing the one or more queue stages.

In step 520, the arbitration unit determines that the request was submitted to the request queue based on the submitted indication. In one embodiment, step 520 may include the arbitration unit receiving the sent indication while the request associated with the indication has stalled in one of the one or more queue stages. In some embodiments, step 520 may further include the arbitration unit determining when the request was submitted based on the received indication.

In step 530, the arbitration unit selects, based on the determining in step 520, an ordering in which the target circuit is to service requests from the plurality of requests queues such as described above.

Exemplary Computer System

Figure 6:
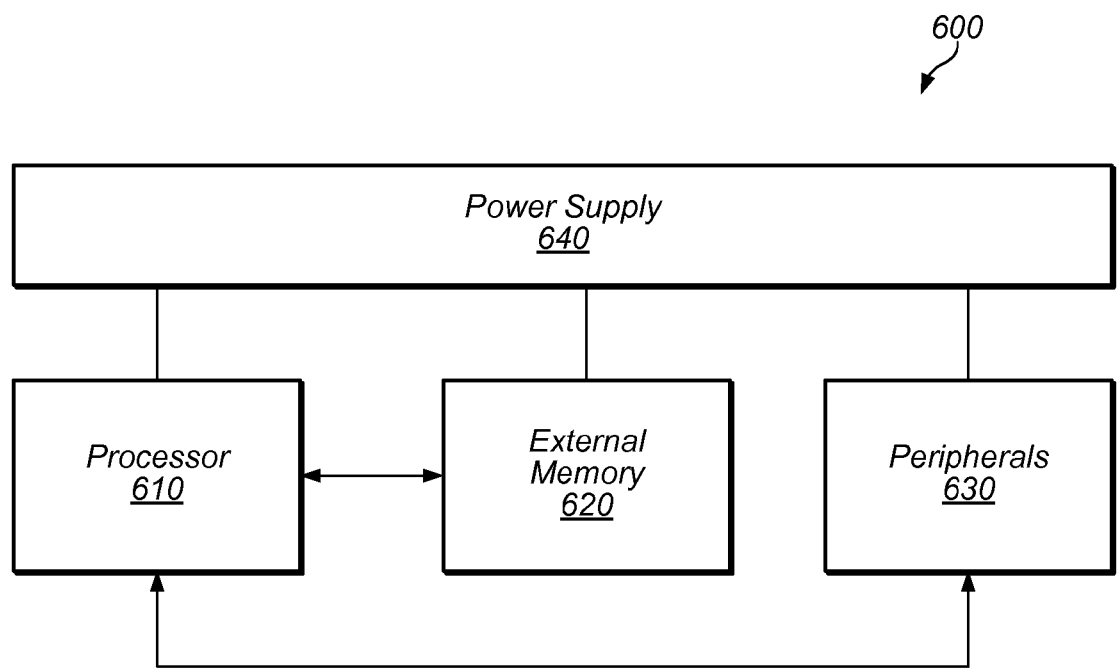
FIG. 6 is a block diagram illustrating one embodiment of an exemplary computer system.

Turning now to FIG. 6, a block diagram of one embodiment of a system 600 is shown. As discussed above, master and target circuits may be used on a variety of applications. System 600 is one embodiment of a system that may include one or more instances of system 200. Accordingly, in some embodiments, system 200 may be included within or be divided among processor 610, external memory 620, and/or peripherals 630 described below.

In the illustrated embodiment, processor 610 is coupled to an external memory 620. The external memory 620 may form a main memory subsystem for system 600. Processor 610 is also coupled to one or more peripherals 630. A power supply 640 is also provided which supplies the supply voltages to processor 610 as well as one or more supply voltages to the memory 620 and/or the peripherals 630. In some embodiments, more than one instance of processor 610 may be included (and more than one external memory 620 may be included as well).

The memory 620 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit that also includes processor 610 in a chip-on-chip configuration, a package-on-package configuration, or a multi-chip module configuration.

The peripherals 630 may include any desired circuitry, depending on the type of system 600. For example, in one embodiment, the system 600 may be a mobile device (e.g. personal digital assistant (PDA), smart phone, etc.) and the peripherals 630 may include devices for various types of wireless communication, such as wifi, Bluetooth, cellular, global positioning system, etc. The peripherals 630 may also include additional storage, including RAM storage, solid state storage, or disk storage. The peripherals 630 may include user interface devices such as a display screen, including touch display screens or multitouch display screens, keyboard or other input devices, microphones, speakers, etc. In other embodiments, the system 600 may be any type of computing system (e.g. desktop personal computer, laptop, workstation, net top etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    an arbitration unit coupled to a plurality of request queues for a target circuit, wherein each request queue is configured to store requests generated by a respective one of a plurality of master circuits, wherein a request queue of one of the plurality of master circuits includes one or more queue stages, wherein each queue stage is configured to store a request from the master circuit and is associated with a respective latch, wherein the master circuit is configured to send, via the one or more respective latches, an indication specifying that a request has been submitted;
    wherein the one or more latches are driven separately from latches implementing the one or more queue stages such that the arbitration unit is configured to receive the sent indication while the request associated with the indication has stalled in one of the one or more queue stages;
    wherein the arbitration unit is configured to arbitrate between requests in the plurality of request queues based on information indicative of an ordering in which requests were submitted to the plurality of request queues by the plurality of master circuits, wherein the information includes the received indication, and wherein the arbitration unit is configured to determine when the request was submitted based on the received indication.

2. The apparatus of claim 1, wherein each of the plurality of master circuits are configured to submit, with each request to the target circuit, an indication specifying that a request has been submitted, and wherein the arbitration unit is configured to determine the ordering in which requests were submitted based on the submitted indications.

3. The apparatus of claim 2, wherein the indications further specify a priority for a respective request, and wherein the arbitration unit is configured to select between a plurality of requests received at the same time based on the specified priorities.

4. An apparatus, comprising:
    a master circuit configured to send a request to a target circuit and an indication of the request via a plurality of latch stages, wherein the plurality of latch stages includes a first set of latches configured to store the request as the request is sent to the target circuit, wherein the plurality of latches includes a second set of latches configured to store the indication, wherein the second set of latches are driven separately from the first set of latches;
    wherein the target circuit is configured to receive requests from a plurality of master circuits, and wherein the apparatus is configured to determine, based on the sent indication, an order in which the target circuit is to service ones of the received requests; and
    wherein the master circuit is configured to send requests to a plurality of target circuits and a plurality of indications, each indicating that a respective one of the requests has been submitted, and wherein the master circuit is configured to process responses for each of the requests in only the ordering in which the master circuit sent the requests.

5. The apparatus of claim 4, wherein the master circuit is configured to send the requests along one of a plurality of paths to a respective one of the plurality of target circuits, and wherein each of the plurality of paths has the same number of latch stages.

6. The apparatus of claim 4, wherein the master circuit is configured to send the indication of the request to an arbitration unit associated with the target circuit, wherein the arbitration unit is configured to determine the ordering based on indications sent by ones of the plurality of master circuits.

7. The apparatus of claim 4, wherein the first set of latches is configured to implement a first-in-first-out (FIFO) queue, wherein the apparatus is configured to drive the first set of latches in response to a request being removed from the FIFO queue by the target circuit, and wherein the apparatus is configured to drive the second set of latches during each clock cycle.

8. An apparatus, comprising:
    a target circuit configured to receive requests from a respective one of a plurality of request queues, where each of the requests was generated by a respective one of a plurality of master circuits;

wherein the target circuit is configured to service the requests in an ordering specified by an arbitration unit, wherein the arbitration unit is configured to determine the ordering based on information provided by the plurality of master circuits indicative of when requests were submitted to the plurality of request queues; and wherein the target circuit is configured to respond to a received request by sending a burst response to a master circuit that generated the request.

9. The apparatus of claim 8, wherein each request queue is associated with a set of latches, and wherein a master circuit is configured to write, in response to submitting a request to one of the plurality of request queues, a value to the set of latches associated with that request queue.

10. The apparatus of claim 9, wherein the set of latches are configured to propagate the value to the arbitration unit when the submitted request stalls in the request queue, and wherein the arbitration unit is configured to determine that a request has been submitted to the request queue based on receiving the value.

11. The apparatus of claim 8, further comprising:
a plurality of target circuits including the target circuit, wherein each target circuit is configured to receive requests from a respective plurality of request queues, wherein each queue in a respective plurality of request queues has the same length, and wherein queues in different ones of the pluralities of request queues have different lengths.

12. An apparatus, comprising:
a first set of latches configured to implement stages of a request queue for a target circuit, wherein the first set of latches is configured to propagate a request generated by a master circuit to the target circuit;
a second set of latches configured to propagate an identifier from the master circuit to an arbitration unit, wherein the identifier indicates that a request has been submitted, wherein the arbitration unit is configured to determine an ordering in which the target circuit is to service requests received from a plurality of master circuits based on identifiers received from the plurality of master circuits, and wherein the second set of latches are configured to be latched separately from the first set of latches; and
a third set of latches configured to implement stages of a response queue for the target circuit, wherein the third set of latches are configured to propagate a response for a request from the target circuit to the master circuit.

13. The apparatus of claim 12, wherein the propagated identifier is a single bit that is written by the master circuit upon submitting a request to the first set of latches, and wherein the arbitration unit is configured to determine when a request has been submitted to the first set of latches based on when the arbitration unit received the single bit.

14. The apparatus of claim 12, wherein the propagated identifier is a value that is written by the master circuit upon submitting a request to the first set of latches, wherein the arbitration unit is configured to determine when a request has been submitted to the first set of latches and a priority of the request based on the received value.

15. The apparatus of claim 12, wherein the apparatus is configured to provide a first set of latch signals to the first set of latches to cause the first set of latches to propagate a request from the master circuit to the target circuit, and to provide a second latch signal to cause the second set of latches to propagate an identifier from the master circuit to the arbitration unit, and wherein the apparatus is configured to cycle the second signal when the apparatus is not cycling the first set of signals.

16. A method, comprising:
a master circuit submitting a request to one of a plurality of request queues for a target circuit and an indication of the request to an arbitration unit, wherein the request queue includes a first plurality of latches configured to propagate the request from the master circuit to the target circuit, and wherein the master circuit submits the indication via a second set of latches to the arbitration unit;
latching the second set of latches separately from latching the first set of latches;
the arbitration unit determining that the request was submitted to the request queue based on the submitted indication; and
based on the determining, the arbitration unit selecting an ordering in which the target circuit is to service requests from the plurality of requests queues.

17. The method of claim 16, wherein the arbitration unit receives the indication of the request while the request is stalled in the request queue and waiting to be serviced by the target circuit.

18. The method of claim 16, wherein the indication is a single bit written by the master circuit to the second set of latches.

19. The method of claim 16, wherein the plurality of request queues includes a first queue having a first number of stages and a second queue having a second number of stages, wherein the first number of stages is different than the second number of stages.

* * * * *